United States Patent [19]

Sasaki et al.

[11] Patent Number: 5,425,798

[45] Date of Patent: * Jun. 20, 1995

[54] ZINC ALLOY POWDER FOR ALKALINE CELL AND METHOD TO PRODUCE THE SAME

[75] Inventors: Masamoto Sasaki, Takehara; Tomotaka Motomura, Shimonoseki; Hirofumi Asano, Takehara, all of Japan

[73] Assignees: Mitsui Mining & Smelting Co., Ltd., Tokyo; Matsushita Electric Industrial Co., Ltd., Osaka, both of Japan

[*] Notice: The portion of the term of this patent subsequent to Apr. 28, 2009 has been disclaimed.

[21] Appl. No.: 95,169

[22] Filed: Jul. 21, 1993

Related U.S. Application Data

[63] Continuation-in-part of Ser. No. 847,263, Mar. 5, 1992, abandoned, which is a continuation-in-part of Ser. No. 701,215, May 16, 1991, Pat. No. 5,108,494.

[30] Foreign Application Priority Data

Oct. 16, 1991 [JP] Japan .................................. 3-294839

[51] Int. Cl.$^6$ ...................... B22F 9/08; C22C 18/00; H01M 4/42
[52] U.S. Cl. .................................... 75/347; 75/352; 429/206; 429/229; 420/513; 420/514; 420/520
[58] Field of Search .................. 75/347, 352; 429/206, 429/229; 420/513, 514, 520

[56] References Cited

U.S. PATENT DOCUMENTS 5,168,018 12/1992 Yoshizawa et al. ................ 429/206

FOREIGN PATENT DOCUMENTS 54-42930 12/1979 Japan .................................. 420/514
61-288039 12/1986 Japan .................................. 420/514

*Primary Examiner*—Melvyn J. Andrews
*Assistant Examiner*—Sikyin Ip
*Attorney, Agent, or Firm*—Bucknam and Archer

[57] ABSTRACT

A non-amalgamated zinc alloy powder for use in an alkaline cell which consists of elements selected from the following compositions (1) to (4);

(1) 0.001 to 0.5% by weight of aluminum and 0.01 to 0.5% by weight of bismuth, (2) 0.001 to 0.5% by weight of aluminum, 0.01 to 0.5% by weight of bismuth and indium in an amount greater than zero and up to 1.0% by weight, (3) 0.001 to 0.5% by weight of aluminum, 0.01 to 0.5% by weight of bismuth and lithium in an amount greater than zero and up to 0.5% by weight, (4) 0.001 to 0.5% by weight of aluminum, 0.01 to 0.5% by weight of bismuth, indium in an amount greater than zero and up to 1.0% by weight and calcium or lithium in an amount greater than zero and up to 0.5% by weight;

and the balance being zinc and containing iron as an inevitably accidental impurity in an amount of not more than 1 ppm; and which can greatly suppress the evolution of hydrogen gas and maintain the discharge performance on a practical level:

and a method to produce the same.

12 Claims, 4 Drawing Sheets

ZINC ALLOY POWDER FOR ALKALINE CELL AND METHOD TO PRODUCE THE SAME

This application is a Continuation-in-part of U.S. Ser. No. 847,263 filed Mar. 5, 1992, now abandoned. Ser. No. 847,263 was a continuation-in-part of U.S. Ser. No. 701,215 filed May 16, 1991, which issued on Apr. 28, 1992 as U.S. Pat. No. 5,108,494.

BACKGROUND OF THE INVENTION

1. Field of tile Invention

The present invention relates to a zinc alloy powder for use in an alkaline cell and a method to produce tile same. More particularly, the present invention is relates to a non-amalgamated zinc alloy powder for use in an alkaline cell, which comprises zinc containing iron in an amount of not more than 1 ppm as an inevitably accidental Impurity, and specific elements added so as to suppress the evolution of hydrogen gas and to Improve the leaktightness of a cell without the use of mercury and lead which are toxic elements, and a method to produce the same.

2. Prior Art

The mercury contained in an amalgamated zinc powder used as an anode active material in an alkaline cell has been known to be an essential component for such an active material from the viewpoint of suppressing the evolution of hydrogen gas due to the corrosion of zinc and preventing a liquid from leaking From the cell as a result of the evolution of hydrogen gas.

In light of environmental protection, however, a reduction in the mercury content is required in this field. In line with this requirement, it has become possible to suppress the evolution of hydrogen gas through the addition of not only lead but also aluminum, bismuth, indium and the like as additional elements to zinc so that the mercury content is remarkably reduced from 10% by weight to about 1% by weight.

As further social needs, in recent years, it is required to decrease the mercury content of the anode active material to 0% by weight, in other words, to effect non-amalgamation. This non-amalgamation greatly changes the situation, and it has been difficult to decrease the evolution of hydrogen gas to a desired level even when the above-described additional elements are added. That is, although zinc alloy powders as an anode active material having various types of elements added thereto have been proposed {see, for example, Japanese Patent Appln. Publication Gazette No. (Hei.) 2-22984 (22984/1990) and Japanese Patent Appln. Laid-Open Gazette No. (Sho.) 61-53950 (153950/1986)}, it has been impossible to attain the desired suppression of hydrogen gas evolution when the mercury content is 0% by weight, though such suppression has been possible even when the mercury content is 1% by weight or less.

Recently, in a trend to minimize the content of mercury, the effect of lead to inhibit the zinc corrosion has become increasingly important. Accordingly, anode active materials of low-mercury alkaline cells which have been commercially available generally consist of alloy compositions such as zinc-lead, zinc-aluminum-lead, zinc-aluminum-indium-lead and zinc-bismuth-lead. It has been generally believed that the minimization of the content of mercury is largely attributed to the effect of lead being added, and that non-amalgamation of the anode active material can never be achieved if the lead is not used at all.

By the way, it is known that lead is also as harmful to the human body as mercury is. Accordingly, in view of social demand for a clean environment, the intentional addition of the lead is also not desirable. As mentioned above, however, it has not been possible to date to realize the production of a lead-free active anode material, even in the case of the low amalgamation.

Meanwhile, attempts have been made to suppress the evolution of hydrogen gas and to improve the discharge performance by reducing the impurity content of zinc. For example, Japanese Patent Appln. Laid-Open Gazette No. (Sho.) 62-123653 (123653/1987) describes a reduction in the content of impurities such as iron and chromium. Table 1 on page 4 of the published specification shows that an improvement in the discharge performance while suppressing the evolution of hydrogen gas is attained by reducing the iron content to about 10 ppm in an anode active material which comprises an amalgamated zinc alloy powder containing predetermined amounts of lead, indium and aluminum and containing 1% by weight of mercury.

However, a zinc alloy powder having a mercury content of 0% by weight could not attain the desired effect of suppressing the evolution of hydrogen gas even when the content of iron contained as an impurity was reduced to about 10 ppm and additional elements such as lead were incorporated.

Thus the non-amalgamation of an anode active material and the freeing the material from lead are accompanied by a difficulty which is fundamentally different from that encountered in the low amalgamation leading to a mercury content of 0.6 to 1% by weight, and there has not been developed any alkaline cell wherein a non-amalgamated and lead-free zinc alloy powder is used as an anode active material, the evolution of tile hydrogen gas is suppressed, and the leaktightness is improved.

SUMMARY OF THE INVENTION

The present invention has been made to solve the above-described problems of the prior art. It is an object of the present invention to provide a zinc alloy powder for use in an alkaline cell which substantially suppresses the evolution of hydrogen gas in non-amalgamated and lead-free cells, and a method to produce the same. The final object of the present invention is to improve the leaktightness of a mercury-free alkaline cell.

The present inventors have made intensive studies in line with the above-described objects. As a result, they have found that the objects can be attained by tile synergistic effect of the use of a zinc having an extremely low content of iron as an impurity and the addition of specific elements thereto. The present invention is based on tile above finding.

The zinc alloy powder for use in an alkaline cell according to the present invention consists of elements selected from the following compositions (1) to (4);

(1) 0.001 to 0.5% by weight of aluminum and 0.01 to 0.5% by weight of bismuth, (2) 0.001 to 0.5% by weight of aluminum, 0.01 to 0.5% by weight of bismuth and indium in an amount greater than zero, preferably 1 ppm, and up to 1.0% by weight, (3) 0.001 to 0.5% by weight of aluminum, 0.01 to 0.5% by weight of bismuth and lithium in an amount greater than zero, preferably 1 ppm, and up to 0.5% by weight, (4) 0.001 to 0.5% by weight of aluminum, 0.01 to 0.5% by weight of bismuth, indium in an amount greater than zero, preferably 1 ppm, and up to 1.0% by weight and calcium or lithium in an amount greater than zero, preferably 1 ppm, and up to 0.5% by weight: and the balance being zinc and containing iron as an inevitably accidental impurity in an amount of not more than 1 ppm.

In the present invention, it is a requisite than the content of iron as an inevitably accidental impurity in zinc be not more than 1 ppm. When it exceeds 1 ppm, the effect of suppressing the evolution of hydrogen gas is lowered. The expression "the iron content is not more than 1 ppm" used herein means that the iron content is not greater than the limiting analytical value as measured by the conventional analytical methods, such as ICP or atomic absorption spectrometry, without separating iron from zinc. Neither attempt has hitherto been made to use a zinc or zinc alloy powder having such a low iron content as an anode active material, nor there has been any report describing such use. A high-purity metallic zinc can be prepared for use in special applications such as a semiconductor by special methods such as zone melting. Such a metallic zinc is so expensive that it cannot be used as the raw material of dry cells. Also there is no example wherein such a metallic zinc has been used as an alloy powder. In rectified zinc which is regarded as having the highest purity out of the zinc ingots obtained by industrial mass production, the iron content prescribed in Japanese Industrial Standards is 20 ppm or less. Among the varieties of the rectified zinc, even the one having a particularly low impurity level generally has an iron content of not less than 2 ppm. Further, the iron content of electrolytic zinc is on the same level.

In the present invention, the zinc alloy contains an element component selected from among the above compositions (1) to (4). When the content of each component element falls outside the above-described range, there occur problems such as the failure to attain the desired effect of suppressing the evolution of hydrogen gas or the failure to maintain a practical discharge performance. If elements other than the above-described combinations are added, for example, if aluminum, bismuth, calcium or the like, generally incorporated in a zinc alloy powder used as an anode active material, is added alone, the above-described effects of the present invention cannot be attained.

The production method of the present invention will now be described.

In the present invention, a zinc containing not more than 1 ppm of iron as an inevitably accidental impurity is used. Examples of the zinc having such a low iron content include a deposited zinc obtained by electrolysis and a zinc ingot prepared from zinc obtained by vacuum distillation. A zinc ingot prepared by melting deposited zinc together with a flux, such as ammonium chloride, and casting the melt into a mold has hitherto been used as a starting zinc material of an anode active material. In such zinc ingot, it is impossible to decrease the iron content to not more than 1 ppm. This is because, in general, zinc is contaminated with iron originating in a separator in the step of removing dross formed on the surface of molten zinc and returning partially recovered zinc to the melt. Further, the contamination with iron may occur from a melt pump, a mold or an atmosphere.

Elements listed in the compositions (1) to (4) described above are dissolved in the melt of a zinc having a low iron content so as to be within predetermined ranges of contents. Then, pulverization is performed by atomization, followed by sifting, to thereby give a zinc alloy powder. It is preferred from the viewpoint of further improving the suppressing effect of hydrogen gas evolution to limit the iron content of the atmosphere for each of the melting and atomization steps to not more than 0.009 mg/m$^3$. From the same viewpoint, it is also preferred to magnetically separate the obtained zinc alloy powder.

In this manner, the difference between the conventional method and the method according to the present invention to produce a zinc alloy powder is shown in FIG. 4.

The iron content of the resultant zinc alloy powder is not more than 1 ppm as described above. This powder can suppress the evolution of hydrogen gas to not more than about 300 ul/day-cell (type LR6) which is an allowable upper limit of leaktightness.

With respect to the mechanism of evolving hydrogen gas, macroscopic measurements of the amount of hydrogen gas evolved and presumptive relations between the gas evolution and the structure of crystals have heretofore only been discussed; but, to elucidate said mechanism, there has been made no practical research into as far as the sites at which the hydrogen gas is evolved. This would be the cause for the fact that various techniques so far applied for a patent were practically useless for mercury-free cells, the present inventors thought. Thus, they carefully made microscopic observations and EPMA (Electron Probe X-ray Microanalyzer) analyses of the sites where hydrogen gas was evolved and found that iron, its oxides, alloys and the like in particulate form inevitably contained in zinc powder were sources or causes for evolving hydrogen gas when these particles were present between the zinc particles and/or on the surfaces of the zinc particles.

More specifically, the present inventors microscopically observed that there were specific sites where hydrogen gas was continuously evolved when the zinc powder was immersed in an aqueous solution of potassium hydroxide which was similar to the electrolyte for an alkaline cell. Then, they likewise observed how hydrogen gas was evolved using zinc in the form of comparatively large particles, slender rods or plates to confirm that the gas was evolved at the same sites for a long period of time, after which said sites were marked with a sharp tool. Then, the zinc having said marked sites was analyzed for its composition by EPMA.

As the result of this analysis, it was found that said gas continuous evolution sites necessarily had fine particles of 0.5–5 um in particle size mainly containing iron localized therein. As elements other than iron, there were detected chromium, nickel, silver, sulfur and oxygen in some cases. Thus, it was found that the gas evolution was effected in the presence of a very minute amount of particulate iron and/or iron oxide scattered in the zinc body.

As indicated in the Table 1, particles of various solid materials (other than zinc) having an average particle size of 0.1—several mm were attached to zinc powder or zinc plates in such an amount that the particles so attached had a concentration of 1—several ppm, after which the particles—attached zinc samples were immersed in an aqueous solution of potassium hydroxide to observe how hydrogen gas was evolved with the results being shown in Table 1.

TABLE 1

Gas Evolution Caused by Various Kinds of Particles Added to Zinc

| Particles added | State of gas evolution |
| --- | --- |
| $Fe_2O_3$ (particles) | Vigorous and continuous |
| $Fe_3O_4$ (particles) | Vigorous and continuous |
| $Fe(OH)_2$ (particles) | Slow and gradual |
| $MnO_2$ (particles) | Slow and gradual |
| NiS (particles) | Slow and gradual |
| Stainless steel piece | Vigorous and continuous |
| $Al_2O_3$ (particles) | No evolution |
| CaO (particles) | No evolution |
| $SiO_2$ (partiles) | No evolution |
| Fe (particles) | Vigorous and continuous |
| Cr (particles) | Slow and gradual |
| Ni (Particles) | Vigorous and continuous |

It was found from the results that the sites where the gas was evolved were those where particulate iron, iron oxides or stainless steel was present.

The above experiment indicated that the sources of gas evolution were the fine particles of mainly iron type.

It has also been found by the present inventors that the effect of the addition of lead is more prominently seen in the inhibition of the corrosion through a local cell reaction which could be brought about by the omnipresence of iron in zinc, rather than in the inhibition of a simple corrosion that can be brought about between zinc and electrolyte, and that if the content of iron as an impurity in the zinc is greatly minimized, the rate of hydrogen gas evolution can be controlled, even in the absence of lead, to an amount lower than the allowable upper limit of leaktightness.

In the present invention, therefore, the content of iron as an inevitably accidental impurity in zinc is minimized and predetermined amounts of specific elements other than mercury and lead are added, whereby a synergistic effect works to suppress the evolution of hydrogen gas.

As described above, a zinc alloy powder for use in an alkaline cell and having an iron content of not more than 1 ppm is produced by melting a zinc containing not more than 1 ppm of iron as an inevitably accidental impurity, together with specific elements to give a melt and directly atomizing the melt.

Although this zinc alloy powder is non-amalgamated and lead-free, it can greatly suppress the evolution of hydrogen gas and maintain the discharge performance on a practical level when it is used as an anode active material of an alkaline cell. Further, since neither mercury nor lead is contained, the alkaline cell comprising this zinc alloy powder as an anode active material satisfies social needs.

PREFERRED EMBODIMENTS OF THE PRESENT INVENTION

The present invention will now be described in more detail with reference to the following Examples and Comparative Examples.

EXAMPLES 1 TO 15 AND COMPARATIVE EXAMPLES 1 TO 8

A melt of zinc alloy was prepared by melting an electrolytically deposited zinc containing not more than 1 ppm of iron as an inevitably accidental impurity at about 500° C. and adding thereto predetermined amounts of elements listed in Table 2 in an atmosphere having an iron content of 0.005 mg/m$^3$ in a room.

The melt was directly powdered using high-pressure argon gas (ejection pressure: 5 kg/cm$^2$) in the same atmosphere to give zinc alloy powders, which were sifted to give 50- to 150-mesh powders.

Using a magnet, magnetic separation was performed to thereby remove free iron powder. All of the obtained zinc alloy powders had an iron content of not more than 1 ppm.

An electrolyte was prepared by adding about 1.0% of carboxymethylcellulose and polysodium acrylate as a gelating agent to a 40% aqueous potassium hydroxide solution saturated with zinc oxide.

3.0 g of the above-described zinc alloy powder as an anode active material was mixed with 1.5 g of the electrolyte to thereby give a gel. Using the gel as an anode material, the alkaline manganese cell as shown in FIG. 1 was produced.

This alkaline manganese cell was partially discharged by 25%, and the rate of hydrogen gas evolution due to the corrosion of the zinc alloy powder was measured. The results are given in Table 3. The reason for performing the 25% partial discharge is that the rate of hydrogen gas evolution is maximized around 25% partial discharge supposing that the time necessary for discharge to 0.9 V is 100% for a separately prepared non-mercury alkaline manganese cell. It was supposed that discharge conditions of 1Ω and 11 minutes represent 25% partial discharge.

Figure 1:
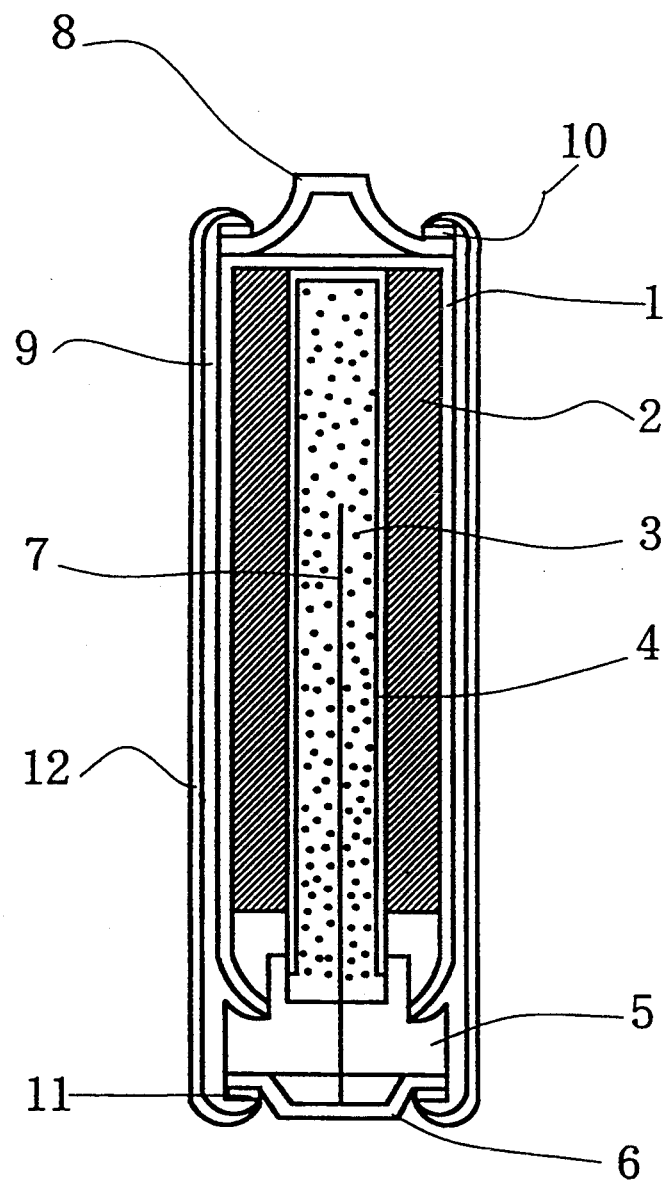
FIG. 1 is a cross-sectional side view of an alkaline manganese cell according to the present invention.

The alkaline manganese cell of FIG. 1 is composed of cathode can 1, cathode 2, anode (gelled zinc alloy powder) 3, separator 4, opening sealant 5, anode bottom plate 6, anode electricity collector 7, cap 8, heat-shrinkable resin tube 9, insulating rings 10 and 11 and exterior can 12.

COMPARATIVE EXAMPLES 9 TO 11

A zinc ingot, as a starting material, prepared by casting according to the conventional procedure an electrolytically deposited zinc having an iron content of not more than 1 ppm, was melted at about 500° C. in an atmosphere having an iron content of 5 mg/m$^3$. Added to the melt were predetermined amounts of elements listed in Table 3 to give zinc alloy melts.

Each of the melts directly powdered using a high-pressure argon (ejection pressure: 25 kg/cm$^2$) in the same atmosphere to give zinc alloy powders, which were sifted to give 50- to 150-mesh powders.

All of the obtained zinc alloy powders had an iron content of 3 ppm. No magnetic selection was performed.

Using each of the zinc alloy powders, an alkaline cell as shown in FIG. 1 was produced in substantially the same manner as that of Example 1 and 25% partial discharge was performed to measure the rate of hydrogen gas evolution. The results are given in Table 3.

TABLE 2

| Example Comp. Ex. | Added elements (wt %) | | | | | Fe content (ppm) | Gas evolution rate μl/cell · day |
|---|---|---|---|---|---|---|---|
| | Al | Bi | Ca | In | Li | | |
| Example 1 | 0.002 | 0.05 | — | — | — | ≦1 | 186 |
| Example 2 | 0.01 | 0.05 | — | — | — | ≦1 | 116 |
| Example 3 | 0.4 | 0.05 | — | — | — | ≦1 | 252 |
| Example 4 | 0.01 | 0.02 | — | — | — | ≦1 | 157 |
| Example 5 | 0.01 | 0.4 | — | — | — | ≦1 | 230 |
| Example 6 | 0.01 | 0.05 | — | 0.05 | — | ≦1 | 51 |
| Example 7 | 0.01 | 0.05 | — | 0.4 | — | ≦1 | 110 |
| Example 8 | 0.01 | 0.05 | — | 0.8 | — | ≦1 | 83 |
| Example 9 | 0.01 | 0.05 | — | — | 0.01 | ≦1 | 92 |
| Example 10 | 0.01 | 0.05 | — | — | 0.08 | ≦1 | 113 |
| Example 11 | 0.01 | 0.05 | — | — | 0.3 | ≦1 | 141 |
| Example 12 | 0.01 | 0.05 | 0.025 | 0.05 | — | ≦1 | 49 |
| Example 13 | 0.01 | 0.05 | 0.08 | 0.05 | — | ≦1 | 47 |
| Example 14 | 0.01 | 0.05 | 0.3 | 0.05 | — | ≦1 | 96 |
| Example 15 | 0.01 | 0.05 | — | 0.05 | 0.01 | ≦1 | 26 |
| Comp. Ex. 1 | — | — | — | — | — | ≦1 | 1728 |
| Comp. Ex. 2 | 0.01 | — | — | — | — | ≦1 | 1117 |
| Comp. Ex. 3 | — | 0.05 | — | — | — | ≦1 | 581 |
| Comp. Ex. 4 | — | — | 0.025 | — | — | ≦1 | 1489 |
| Comp. Ex. 5 | — | — | — | 0.05 | — | ≦1 | 1767 |
| Comp. Ex. 6 | — | — | — | — | 0.01 | ≦1 | 1467 |
| Comp. Ex. 7 | 0.7 | 0.05 | — | — | — | ≦1 | 1331 |
| Comp. Ex. 8 | 0.01 | 0.6 | — | — | — | ≦1 | 580 |
| Comp. Ex. 9 | 0.01 | 0.05 | — | — | — | 3 | 810 |
| Comp. Ex. 10 | 0.01 | 0.05 | — | 0.05 | — | 3 | 451 |
| Comp. Ex. 11 | 0.01 | 0.05 | 0.025 | 0.05 | — | 3 | 483 |

As shown in Table 2, in all of the zinc alloy powders of Examples 1 to 15 having an iron content of not more than 1 ppm and a specific composition, the rate of hydrogen gas evolution is smaller than about 300 ul/day-cell (type LR6) which is an allowable upper limit of leaktightness. By contrast, in the zinc alloy powders of Comparative Examples 1 to 8, the composition falls outside the scope of the present invention and hence, although the iron content is not more than 1 ppm, no effect of suppressing the evolution of hydrogen gas is recognized. Moreover, in the zinc alloy powders of Comparative Examples 9 to 11, the iron content is 3 ppm and hence, irrespective of whether or not the composition falls within the scope of the present invention, no effect of suppressing the evolution of hydrogen gas is recognized.

EXAMPLES 16 TO 19

A zinc alloy powder (Example 16) was produced according to the same composition and conditions as those of Example 2, except that no magnetic separation was performed. A zinc alloy powder (Example 17) was produced according to the same composition and conditions as those of Example 2, except that the melting and the atomization were conducted in an atmosphere of 5 mg/m³.

Similarly, a zinc alloy powder (Example 18) was produced according to the same composition and conditions as those of Example 6, except that no magnetic separation was performed. Further, a zinc alloy powder (Example 19) was produced according to the same composition and conditions as those of Example 6, except that the melting and the atomization were conducted in an atmosphere of 5 mg/m³.

All of the zinc alloy powders thus obtained had an iron content of not more than 1 ppm. Using each of the zinc alloy powders, an alkaline cell shown in FIG. 1 was produced in substantially the same manner as that of Example 1 and 25% partical discharge was performed to measure the rate of hydrogen gas evolution. The results are given in Table 3.

TABLE 3

| Example | Gas evolution rate μl/cell · day |
|---|---|
| Ex. 16 | 116 |
| Ex. 17 | 116 |
| Ex. 18 | 51 |
| Ex. 19 | 51 |

As is apparent from Table b 4, substantially the same results as those of example 2 were obtained in examples 16 to 17, and substantially the same results as those of Example 6 were obtained in Examples 18 to 19.

Experiment 1

Zinc alloy powders of Example 2 and Comparative Example 9 were amalgamated so as to have a mercury content of 1 and 10% by weight, respectively, thereby producing amalgamated zinc alloy powders.

Using each of the amalgamated zinc alloy powders, an alkaline cell shown in FIG. 1 was produced in substantially the same manner as that of Example 1 and 25% partial discharge was conducted to measure the rate of hydrogen gas evolution. The results were plotted together with the values of Example 2 and Comparative Example 9 as shown in FIG. 2.

Figure 2:
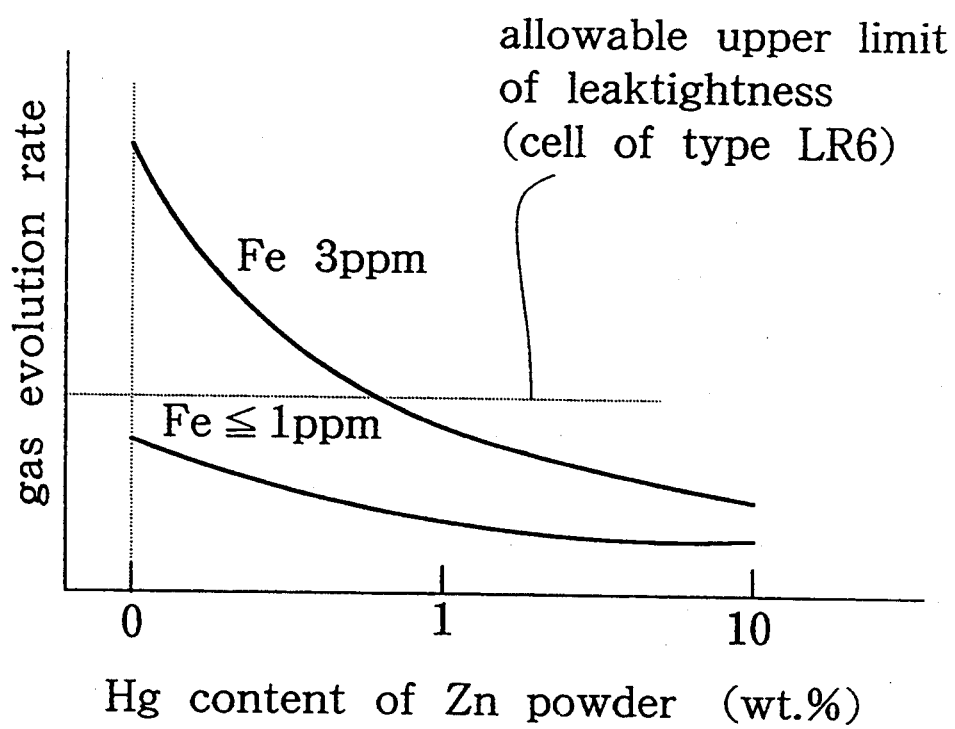
FIG. 2 is a graph showing the relationship between the mercury content of a zinc alloy powder and the rate of hydrogen gas evolution.

As indicated in FIG. 2, when the iron content is 3 ppm, the evolution of hydrogen gas is below the allowable upper limit of leaktightness at a mercury content of 1% by weight or greater. By contrast, when the iron content is not more than 1 ppm, the evolution of hydrogen gas is below the allowable upper limit of leaktightness irrespective of the presence or absence of mercury.

Experiment 2

Various kinds of zinc alloy powders which consist of (1) 0.01% by weight of aluminum, 0.05% by weight of bismuth and the balance being zinc; (2) 0.01% by weight of aluminum, 0.05% by weight of bismuth, 0.05% by weight of lead and the balance being zinc; or (3) 0.01% by weight of aluminum, 0.05% by weight of bismuth, 0.05% by weight of lead, 0.15% by weight of mercury and the balance being zinc, respectively, and further contain various amounts of iron were produced in substantially the same manner as that of Example 2.

Using each of these zinc alloy powders, an alkaline cell shown in FIG. 1 was produced in substantially the same manner as that of Example 1 and 25% partial discharge was conducted to measure the rate of hydrogen gas evolution. The results were plotted as shown in FIG. 3.

Figure 3:
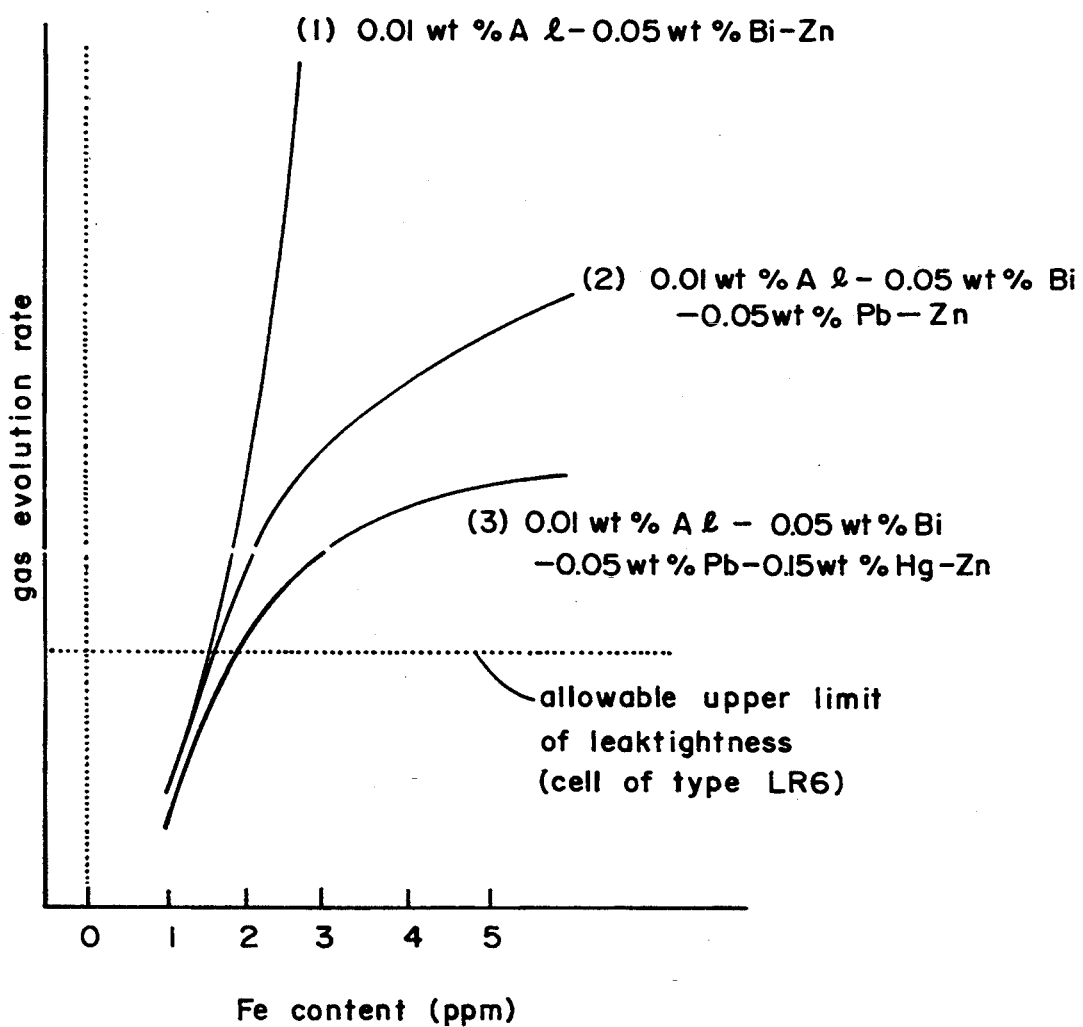
FIG. 3 is a graph showing the relationship between the iron content of a zinc alloy powder and the rate of hydrogen gas evolution.
Figure 4:
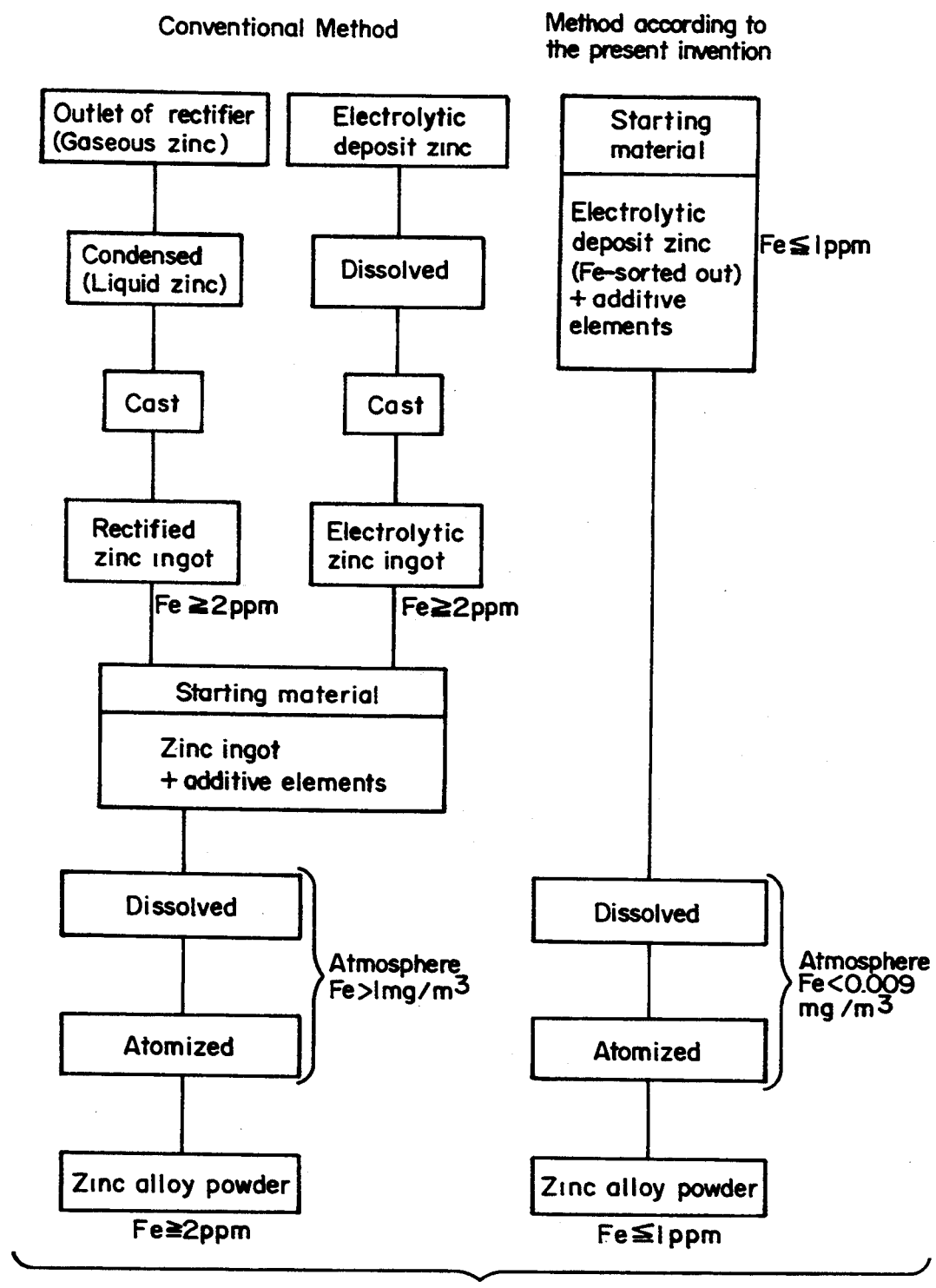
FIG. 4 is a flow sheet comparing a conventional method and the method according to the present invention.

As indicated in FIG. 3, when the content of iron as an inevitably accidental impurity is not less than 2 ppm, the evolution of hydrogen gas is above the allowable upper limit of leaktightness irrespective of the presence or absence of mercury and lead. It is found that the iron content must be not more than 1 ppm to maintain the evolution of hydrogen gas below the allowable upper limit of leaktightness irrespective of the presence or absence of mercury and lead.

What is claimed is:

1. A non-amalgamated zinc alloy powder for use in an alkaline cell, which consists of 0.001 to 0.5% by weight of aluminum and 0.01 to 0.5% by weight of bismuth, the balance being zinc and containing iron as an inevitably accidental impurity in an amount of not more than 1 ppm.

2. A non-amalgamated zinc alloy powder for use in an alkaline cell, which consists of 0.001 to 0.5% by weight of aluminum, 0.01 to 0.5% by weight of bismuth and indium in an amount greater than zero and up to 1.0% by weight, the balance being zinc and containing iron as an inevitably accidental impurity in an amount of not more than 1 ppm.

3. A non-amalgamated zinc alloy powder for use in an alkaline cell, which consists of 0.001 to 0.5% by weight of aluminum, 0.01 to 0.5% by weight of bismuth and lithium in an amount greater than zero and up to 0.5% by weight, the balance being zinc and containing iron as an inevitably accidental impurity in an amount of not more than 1 ppm.

4. A non-amalgamated zinc alloy powder for use in an alkaline cell, which consists of 0.001 to 0.5% by weight of aluminum, 0.01 to 0.5% by weight of bismuth, indium in an amount greater than zero and up to 1.0% by weight and calcium or lithium in an amount greater than zero and up to 0.5% by weight, the balance being zinc and containing iron as an inevitably accidental impurity in an amount of not more than 1 ppm.

5. A method to produce a non-amalgamated zinc alloy powder for use in an alkaline cell, having an iron content of not more than 1 ppm, which consists essentially of melting an electrolytic deposited zinc obtained by electrolysis and containing iron as an inevitably accidental impurity in an amount of not more than 1 ppm, together with elements in such amounts in one of the following compositions (1) to (4);

(1) 0.001 to 0.5% by weight of aluminum and 0.01 to 0.5% by weight of bismuth, (2) 0.001 to 0.5% by weight of aluminum, 0.01 to 0.5% by weight of bismuth and indium in an amount greater than zero and up to 1.0% by weight, (3) 0.001 to 0.5% by weight of aluminum, 0.01 to 0.5% by weight of bismuth and lithium in an amount greater than zero and up to 0.5% by weight, (4) 0.001 to 0.5% by weight of aluminum, 0.01 to 0.5% by weight of bismuth, indium in an amount greater than zero and up to 1.0% by weight and calcium or lithium in an amount greater than zero and up to 0.5% by weight:

and directly atomizing the formed melt.

6. The method to produce a non-amalgamated zinc alloy powder for use in an alkaline cell according to claim 5, wherein the melting and the atomization are conducted in an atmosphere having an iron content of 0.009 mg/m$^3$ or less.

7. The method to produce a non-amalgamated zinc alloy powder for use in an alkaline cell according to claim 5, wherein the atomized powder is magnetically separated.

8. The method to produce a non-amalgamated zinc alloy powder for use in an alkaline cell according to claim 6, wherein the atomized powder is magnetically separated.

9. The alkaline cell comprising the non-amalgamated zinc alloy powder according to claim 1 as an anode active material.

10. The alkaline cell comprising the non-amalgamated zinc alloy powder according to claim 2 as an anode active material.

11. The alkaline cell comprising the non-amalgamated zinc alloy powder according to claim 3 as an anode active material.

12. The alkaline cell comprising the non-amalgamated zinc alloy powder according to claim 4 as an anode active material.

* * * * *